US006666939B2

(12) United States Patent
Kimura et al.

(10) Patent No.: US 6,666,939 B2
(45) Date of Patent: Dec. 23, 2003

(54) MEMBER FOR OIL APPLICATION DEVICE, METHOD OF MANUFACTURING THE MEMBER, AND OIL APPLICATION DEVICE

(75) Inventors: Kohichi Kimura, Hamamatsu (JP); Osamu Horiuchi, Hamamatsu (JP); Yousuke Suganuma, Hamamatsu (JP); Shigeru Nakama, Hamamatsu (JP)

(73) Assignee: Nichias Co., Ltd., Tokyo (JP)

( * ) Notice: Subject to any disclaimer, the term of this patent is extended or adjusted under 35 U.S.C. 154(b) by 0 days.

(21) Appl. No.: 10/369,645

(22) Filed: Feb. 21, 2003

(65) Prior Publication Data

US 2003/0161978 A1 Aug. 28, 2003

Related U.S. Application Data

(62) Division of application No. 09/977,368, filed on Oct. 16, 2001, now abandoned.

(30) Foreign Application Priority Data

Nov. 14, 2000 (JP) ....................................... 2000-346321

(51) Int. Cl.$^{7}$ ................................................. B32B 7/08

(52) U.S. Cl. ......................... 156/93; 156/188; 156/190; 156/215; 156/218; 156/227; 118/268; 428/36.5; 428/36.91; 428/102

(58) Field of Search .............................. 156/91, 92, 93, 156/184, 185, 187, 188, 190, 212, 213, 214, 215, 217, 218, 227; 118/244, 268; 29/895.21, 895.211, 895.213, 895.23, 895.3; 399/357, 325; 428/36.5, 36.9, 36.91, 102

(56) References Cited

U.S. PATENT DOCUMENTS

| | | | | | |
|---|---|---|---|---|---|
| 2,668,296 | A | * | 2/1954 | Welch | 428/104 |
| 3,507,023 | A | * | 4/1970 | Matt et al. | 29/898.055 |
| 4,757,347 | A | * | 7/1988 | Tamaoki et al. | 399/325 |
| 5,267,004 | A | | 11/1993 | Mills | |
| 5,674,020 | A | | 10/1997 | Kimura et al. | |
| 5,690,739 | A | | 11/1997 | Sassa et al. | |
| 5,732,317 | A | * | 3/1998 | Orchard et al. | 399/325 |
| 5,779,795 | A | * | 7/1998 | Bucher et al. | 118/264 |
| 5,800,745 | A | | 9/1998 | Miyahara et al. | |
| 5,902,653 | A | | 5/1999 | Miyahara et al. | |
| 6,117,528 | A | | 9/2000 | Hobson et al. | |
| 6,336,972 | B1 | | 1/2002 | Kimura et al. | |
| 6,480,694 | B1 | | 11/2002 | Kimura et al. | |
| 6,519,440 | B2 | | 2/2003 | Kimura et al. | |
| 6,579,813 | B1 | * | 6/2003 | Kimura et al. | 442/320 |

* cited by examiner

*Primary Examiner*—Jeff H. Aftergut
*Assistant Examiner*—Gladys Corcoran
(74) *Attorney, Agent, or Firm*—Oblon, Spivak, McClelland, Maier & Neustadt, P.C.

(57) ABSTRACT

A tubular member for an oil application device is formed separately and is fitted in such a manner as to cover a peripheral face of a porous cylindrical oil retaining member. The tubular member for the oil application device has a multi-layer structure including an inner layer and an outermost layer. The inner layer is a fibrous layer, and the outermost layer is a porous film. The porous cylindrical oil retaining member can be easily covered with, fitted with, and removed of the member for the oil application device, which is made from a fibrous layer such as a felt or from a porous film such as a PTFE film.

6 Claims, 6 Drawing Sheets

(C)

MEMBER FOR OIL APPLICATION DEVICE, METHOD OF MANUFACTURING THE MEMBER, AND OIL APPLICATION DEVICE

This application is a Division of application Ser. No. 09/977,368, filed on Oct. 16, 2001 now abandoned.

TECHNICAL FIELD

The invention relates to a member for an oil application device which is a component of a fixing device of a capacitance type copying machine, an electrophotographic printer or the like. The invention also relates to a method of manufacturing such a member and to an oil application device.

BACKGROUND ART

In a fixing device of a capacitance type copying machine, an electrophotographic printer or the like, during fixation of toner that has been transferred to a recording paper, the toner may adhere to a thermal fixing roller. In order to prevent the toner from soiling another recording paper, a very small amount of releasing oil such as silicon oil is applied to the thermal fixing roll using an oil application device. Thus, toner is prevented from adhering to the thermal fixing roll, and recording papers are prevented from being stuck to one another and rolled up.

Various oil application devices having such a function have already been proposed. For example, Japanese Patent Application Laid-Open No. 2000-079365 discloses an oil application device that is designed such that a felt is wound around and bonded to a peripheral face of a cylindrical porous ceramic compact and that a PTFE film is bonded and fixed to a peripheral face of the felt.

Various methods are adopted to attach the felt layer to the peripheral face of the porous ceramic compact in the above-mentioned oil application device. According to one of such methods, a sheet-like felt fiber is wound around a peripheral face of a porous ceramic compact by one turn, an adhesive is applied to edges of end portions of the felt fiber, and opposed end faces thereof are bonded together and fixed. According to another one of such methods, an adhesive is applied to edges of a felt that has been cut into the shape of a ribbon strip, and the felt is spirally wound around and fixed to a porous ceramic compact while the edges abut on each other without overlapping with each other.

On the other hand, in order to fix a PTFE film to a peripheral face of a felt, it is customary to apply an adhesive to the back of a sheet-like PTFE film and wind the sheet-like PTFE film around a peripheral face of a felt layer so as to fix the sheet-like PTFE film to the felt layer. A method of bonding in this case requires refinements. For instance, an adhesive is applied spirally or in a dotted manner so as to define a section to be bonded and guarantee oil for application of a passage.

However, the oil application device constructed as described above requires separately bonding the felt and the PTFE film and is thus troublesome from the standpoint of processes of fabricating the application device. Further, seam portions of the spirally wound felt is more obstructive to the transfer of oil than the other portions thereof, thus causing a problem of a decrease in amount of application of oil. Such seam portions of the felt exist over the entire peripheral face of the felt layer. Thus, if printing is carried out using this oil application device, streaky irregularities in gloss appear on the entire surface of a printed matter.

On one hand, if the oil application device is used for a certain period, it runs out of oil held therein and requires being replenished with oil. The felt and the PTFE film are damaged after use for a certain period and have no choice but to be destroyed. In particular, the PTFE film is altered by being heated up to 150° C. or more at a fixing portion. In addition, the PTFE film suffers a severe deterioration such as deformation or closure of open pore portions resulting from stains of toner components, adhesion of toner components, and heat. It is thus impossible to recycle the PTFE film. Further, the felt layer is also deprived of its flexibility by heat and can no longer guarantee uniform application of a predetermined amount of oil. Therefore, it is difficult to recycle the felt layer as in the case of the PTFE film.

On the other hand, the porous ceramic compact can be recycled if it is impregnated with releasing oil again. However, the recycling of the porous ceramic compact requires peeling off the felt layer and the PTFE film. Even in an attempt to attach a brand-new felt and a brand-new PTFE film, they must be separately bonded with an adhesive as described above. This causes a problem of troublesomeness from the standpoint of processes of reconstructing the oil application device.

It is thus an object of the present invention to provide a member for an oil application device which makes it easy for a porous cylindrical oil retaining member to be covered with, to be fitted with, or to be removed of a member made from a fibrous layer such as a felt or from a porous film such as a PTFE film. It is also an object of the present invention to provide a method of manufacturing such a member and an oil application device employing the member.

DISCLOSURE OF THE INVENTION

The inventors conducted studies wholeheartedly under such circumstances and have discovered the following facts. That is, a sheet-like felt is formed into a tubular object, for example, using a dummy cylindrical mold. A PTFE film is then fixed to a peripheral face of the tubular object with an adhesive or the like, and the tubular object is drawn out of the dummy cylindrical mold, so that a tubular member having a double-layer structure is obtained. A porous cylindrical oil retaining member can be easily covered with, fitted with, and removed of this tubular member. Further, the sheet-like felt is fitted to the dummy cylindrical mold according to a method comprising the steps of folding the sheet-like felt in two, sewing up end portions thereof, cutting off margins of the end portions if need be, reversing the sheet-like felt, and covering the dummy cylindrical mold with it. This method ensures that the sewn-up portions are hidden inside, thus making it possible to stabilize application performance. Finally the inventors succeeded in completing the present invention.

That is, the present invention (1) provides a tubular member for an oil application device which has been formed separately so as to cover a peripheral face of a porous cylindrical oil retaining member, wherein the tubular member for the oil application device has a multi-layer structure including an inner layer and an outermost layer, wherein the inner layer is a fibrous layer, and wherein the outermost layer is a porous film. Adoption of such a construction ensures that the porous cylindrical oil retaining member can be covered with the member for the oil application device easily, thus making it possible to fabricate the oil application device easily and enhance the overall productivity. Further, if the porous cylindrical oil retaining member is recycled, the member for the oil application device can be easily removed from the porous cylindrical oil retaining member, and can be fixed thereto without using an adhesive during assembly. Therefore, the porous cylindrical oil retaining member is prevented from being soiled with an adhesive, and the regeneration cost can be reduced.

Further, the present invention (2) provides the member for the oil application device wherein the fibrous layer is a fiber felt and wherein the porous film is a PTFE film. Adoption of such a construction ensures that the fiber felt can sufficiently perform the function of an oil transfer layer and that the PTFE film can sufficiently perform the function of an oil application amount control layer, thus making it possible to guarantee a fixing roll of uniform application of a predetermined amount of oil without causing irregularities.

Further, the present invention (3) provides the member for the oil application device wherein the fibrous layer and the porous film are bonded together by the mixture of an adhesive and silicon oil. Adoption of such a construction ensures that the adhesive components in their solidified state are dispersed into silicon oil and exist partially inside the open pores in the porous film, thus making it possible to enhance strength and durability of the porous film. On the other hand, since the mixture of the adhesive and silicon oil is microscopically in a state where the adhesive is dispersed into silicon oil, the silicon oil area serves as a passage for releasing oil inside the open pores. Accordingly, the open pores in the porous film are filled with the mixture, whereby releasing oil is guaranteed of a passage despite closure of the open pores. Consequently, it becomes possible to apply a suitable amount of releasing oil and control the amount of application of releasing oil.

Further, the present invention (4) provides a method of manufacturing a member for an oil application device, comprising the steps of winding a sheet-like fibrous material, which is longer than a circumferential length of a dummy cylindrical mold that is substantially equal in diameter to a porous cylindrical oil retaining member to be covered, around the dummy cylindrical mold by one turn so as to form a fibrous layer, sewing up bonded portions, pressing at least the bonded portions so as to form a peripheral face, and winding a sheet-like porous film around the peripheral face of the fibrous layer by one turn so as to bond the sheet-like porous film to the fibrous layer. Adoption of such a construction makes it possible to fabricate the member for the oil application device reliably by a simple method. Further, since the sheet-like fibrous layer is formed into a cylindrical shape, the number of seams in the fibrous layer is reduced. As a result, it becomes possible to achieve uniform application of oil without causing irregularities.

Further, the present invention (5) provides a method of manufacturing a member for an oil application device, comprising the steps of folding a sheet-like fibrous material in two and sewing up end portions thereof, reversing the sheet-like fibrous material that has been sewn up and covering a dummy cylindrical mold, which is substantially equal in diameter to a porous cylindrical oil retaining member to be covered, with the sheet-like fibrous material, and winding a sheet-like porous film around a surface of the sheet-like fibrous material covering the dummy cylindrical mold by one turn so as to bond the sheet-like porous film to the sheet-like fibrous material. Adoption of such a construction makes it possible to fabricate the cylindrical member for the oil application device easily. Also, this construction makes it possible to suppress the influence of the sewn-up portion and to apply oil uniformly without causing irregularities despite the simplicity of processes of fabrication.

Further, the present invention (6) provides an oil application device having a porous cylindrical oil retaining member that is covered on a peripheral face thereof with a tubular member for the oil application device which has been formed separately, wherein the tubular member for the oil application device has a multi-layer structure including an inner layer and an outermost layer, wherein the inner layer is a fibrous layer, and wherein the outermost layer is a porous film. Adoption of such a construction realizes a simple structure in which the porous cylindrical oil retaining member is covered with the tubular member for the oil application device which has been formed separately, thus making it possible to reduce the number of failures and to achieve stable application of oil. Further, if the porous cylindrical oil retaining member is recycled, the tubular member for the oil application device can be easily removed from the porous cylindrical oil retaining member. This makes it possible to enhance the workability during recycling.

Further, the present invention (7) provides the oil application device wherein the tubular member for the oil application device is folded at opposed end portions thereof onto lateral faces of the porous cylindrical oil retaining member and wherein folded portions of the tubular member for the oil application device are pressed and fixed by a fixture member. Adoption of such a construction makes it possible to fix the tubular member for the oil application device to the porous cylindrical oil retaining member without using an adhesive.

DETAILED DESCRIPTION

Figure 1:
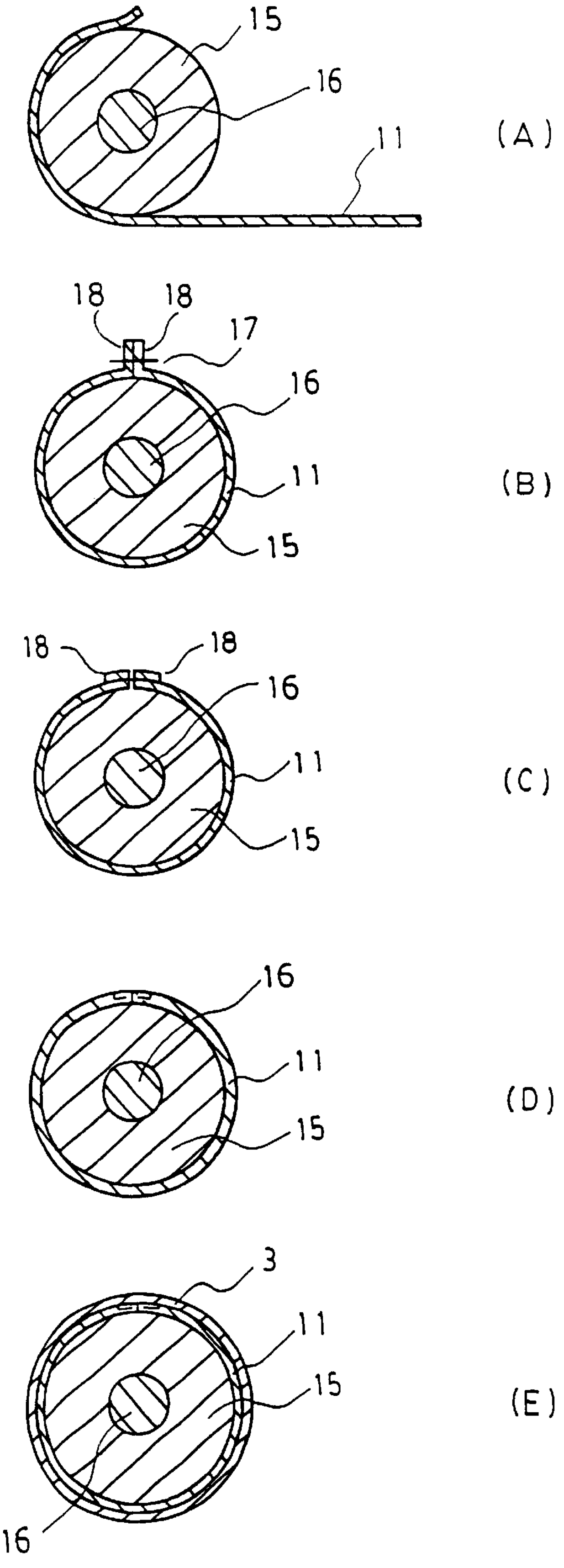
FIGS. 1(A) to 1(E) illustrate a procedure of manufacturing a member for an oil application device of the present invention.
Figure 2:
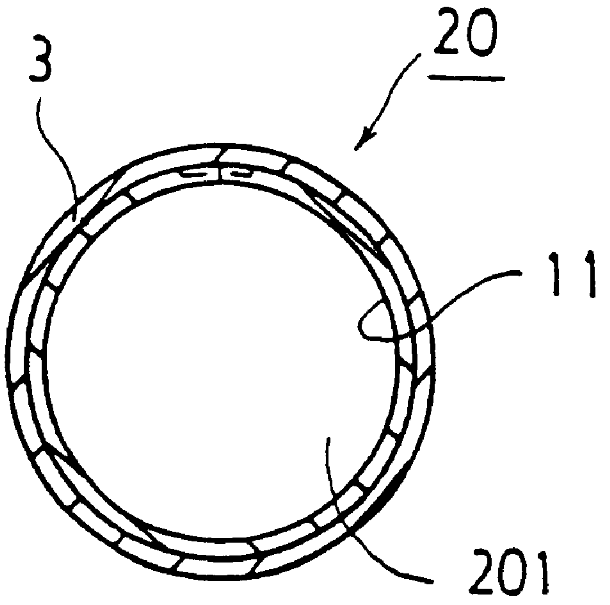
FIG. 2 is a radial sectional view of the member for the oil application device of the present invention.

First of all, a first method of manufacturing a member for an oil application device of the present invention will be described with reference to FIGS. 1 and 2. First of all, a sheet-like fibrous material is wound around a dummy cylindrical mold 15 by one turn so as to form a fibrous layer 11 (FIG. 1(A)). The dummy cylindrical mold 15 is substantially equal in diameter to a porous cylindrical oil retaining member to be covered (a later-described member denoted by a reference numeral 2 in FIG. 4). The sheet-like fibrous material is longer than the circumference of the dummy cylindrical mold 15. The dummy cylindrical mold 15 is designed to form the sheet-like fibrous material into a tubular shape. It is to be noted herein that the sheet-like fibrous material has a width equal to the sum of the length of the porous cylindrical oil retaining member to be covered later and the length of portions folded onto opposed ends thereof. Further, the dummy cylindrical mold 15 preferably has a diameter which is 95% to 105% of the diameter of the porous cylindrical oil retaining member. More preferably, the dummy cylindrical mold 15 has a diameter equal to or approximately 1 to 5% larger than the diameter of the porous cylindrical oil retaining member. If the sheet-like fibrous material is flexible enough, the dummy cylindrical mold 15 may preferably have a diameter approximately 1 to 5% smaller than the diameter of the porous cylindrical oil retaining member. A reference numeral 16 denotes a shaft.

When the oil application device is formed, the sheet-like fibrous material serves as an oil transfer layer. A heat-resistant fiber felt can be used as the sheet-like fibrous material. This heat-resistant fiber felt is obtained, for example, by forming fiber material groups into a plate-like web by roller forming and then processing the web by needle punching. The heat-resistant fiber felt is made from a fiber material with a diameter of approximately 10 $\mu$m and has a three-dimensional flexible network structure with a weight of approximately 200 to 800 $\mu g/m^2$, a thickness of 1 to 5 mm, and a density of 170 to 260 $kg/m^3$.

The sheet-like fibrous material is wound around the dummy cylindrical mold 15 by one turn, and has bonding edges 18 formed at opposed end portions thereof. The bonding edges 18 at the opposed end portions abut on each other, and root portions thereof are bonded together. Although a method of bonding the root portions is not specifically limited, they can be bonded easily and reliably by being sewn up using a thread 17 (FIG. 1(B)). After the bonded portions have been sewn, two bonding edges located above the sewn portions are opened in opposed directions (FIG. 1(C)).

Then, at least the bonded portions are pressed inwards so as to shape a peripheral face (FIG. 1(D)). Preferably, the entire peripheral face of the fibrous layer 11 is pressed inwards. The shaping of the peripheral face is preferably carried out such that the bonded portions are not protrusively strained and that a smooth periphery is formed.

After the bonded portions have been pressed, a sheet-like porous film is wound around the peripheral face of the fibrous layer 11 by one turn and bonded thereto (FIG. 1(E)). When the sheet-like porous film is wound around the peripheral face of the fibrous layer 11 by one turn, the porous film 3 has edges thereof overlapping with each other by a width of approximately 1 to 20 mm. When the oil application device is formed, the sheet-like porous film serves as an oil application amount control layer. The sheet-like porous film is not specifically limited as long as silicon oil permeates therethrough. For example, an elongated polytetrafluoroethylene (PTFE) porous film can be used as the sheet-like porous film. For example, the PTFE film used herein demonstrates a surface roughness Ra of 0.7 to 0.8 $\mu$m, a thickness of 20 to 100 $\mu$m, a gas permeability of 5 to 100 seconds/100 cc, an open pore diameter of 0.05 to 2.0 $\mu$m, and an open pore rate of 70 to 90%. "Gas permeability" represents a Gurley number (unit: seconds/100 cc) measured by a B-type Gurley densometer. "Open pore rate" represents a value calculated from a specific weight measurement according to the following equation: open pore rate (%)=(1−bulk specific gravity/absolute specific gravity)×100.

It is preferable that the peripheral face of the fibrous layer 11 and the sheet-like porous film be bonded together by the mixture of an adhesive and silicon oil. It is important for this mixture that the adhesive and silicon oil be mixed with each other sufficiently and be dispersed into each other. It is preferable to use silicon varnish as the adhesive. For example, it is possible to use the mixture having such a mixture ratio that silicon varnish constitutes 70 weight % and that silicon oil constitutes 30 weight %. Although both entire bonding and partial bonding are acceptable, the former is preferred because it can enhance a bonding strength of the porous film 3 and thus achieve higher reliability. In the case of entire bonding, the mixture is applied to the back (bonding surface) of the porous film 3, for example, with a surface density of 10 to 250 $g/m^2$. The surface is laminated onto the fibrous layer 11 and dried for 1 to 4 hours so as to solidify adhesive components. Because the adhesive components in their solidified state are thus dispersed into silicon oil and exist partially inside the open pores, it is possible to further enhance strength and durability of the porous film 3. On the other hand, the mixture of the adhesive and silicon oil is microscopically in a state where the adhesive is dispersed into silicon oil. Therefore, the silicon oil area constitutes a passage for releasing oil inside the open pores. Accordingly, the open pores in the porous film 3 are filled with the mixture, whereby releasing oil is guaranteed of a passage despite closure of the open pores. Consequently, it becomes possible to apply a suitable amount of releasing oil and control the amount of application of releasing oil.

Next, a tubular double-layer structure composed of the fibrous layer 11 and the porous film 3 is removed from the dummy cylindrical mold 15. As a method of removal, it is appropriate that the dummy cylindrical mold 15 be fixed and that the tubular double-layer structure be drawn from the dummy cylindrical mold 15 on one side thereof. Thereby, a member 20 for the oil application device of the present invention can be obtained (FIG. 2). The member 20 for the oil application device of the present invention has a double-layer structure composed of inner and outer layers. The inner layer is the fibrous layer 11, and the outer layer is the porous film 3.

Figure 3:
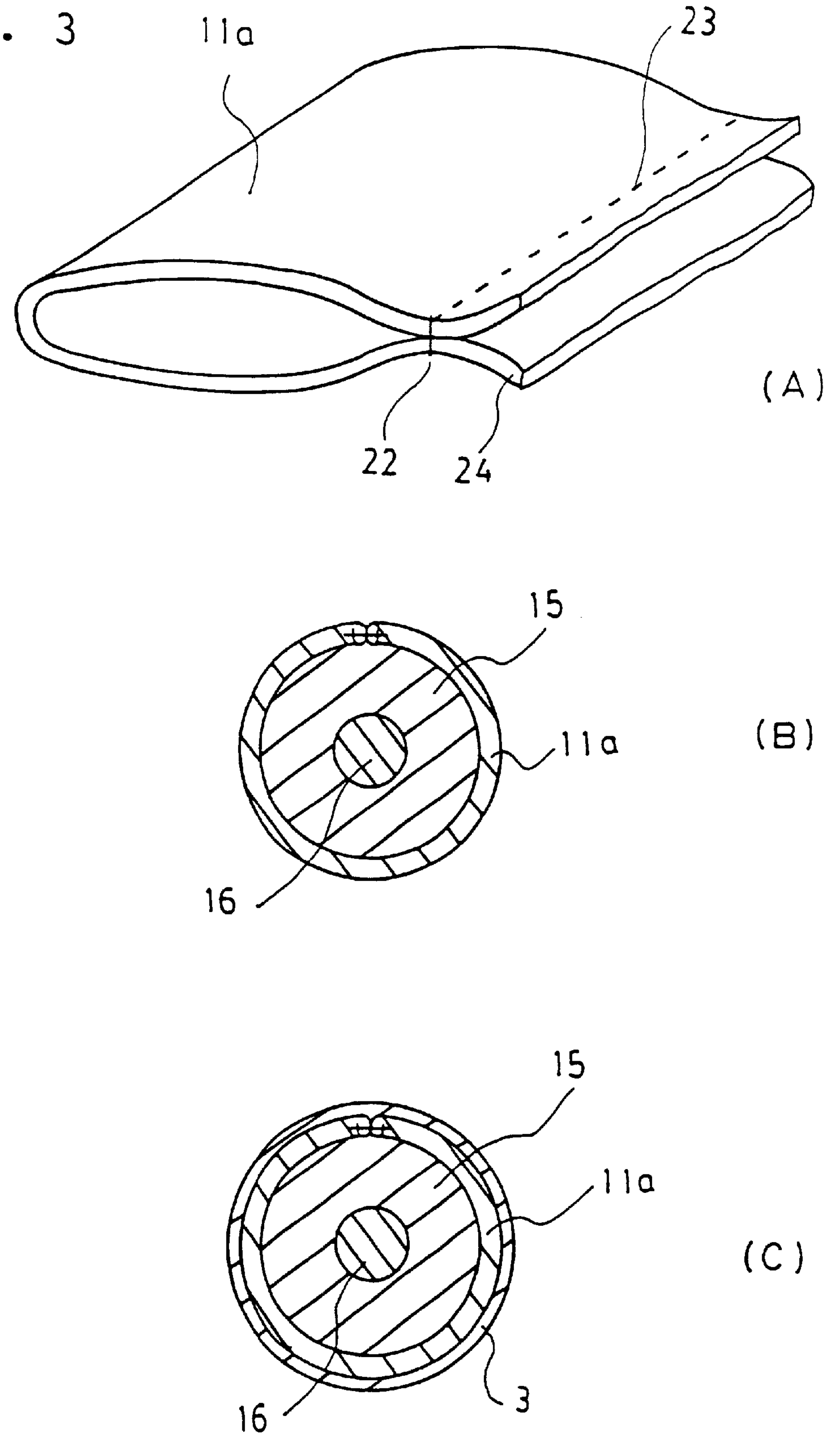
FIGS. 3(A) to 3(C) illustrate another procedure of manufacturing the member for the oil application device of the present invention.

A second method of manufacturing the member for the oil application device of the present invention will be described with reference to FIG. 3. First of all, a sheet-like fibrous material 11*a* is folded in two and is sewn up at end portions thereof so as to form a bag-shaped object, sleeve, (FIG. 3(A)). It is to be noted herein that the inner diameter of the bag-shaped object is substantially equal to the outer diameter of the dummy cylindrical mold 15 with which the bag-shaped object is to be covered later. In FIG. 3(A), reference numerals 22 and 23 denote a sewn-up portion and a seam respectively. Herein, margins 24 are left in the end portions so as to make it easy to sew up the end portions. Then the margins 24 are removed and the bag-shaped object is reversed, inverted. In other words, the bag-shaped object is turned inside out and outside in. Thereby the sewn-up portion 22 is hidden inside. Next, the dummy cylindrical mold 15, which is substantially equal in diameter to the porous cylindrical oil retaining member with which the reversed bag-shaped object is covered, is inserted through the bag-shaped object. Thereby, a fibrous layer 11*a* is formed along the outer periphery of the dummy cylindrical mold 15. Herein, hot pressing can be performed so as to eliminate a bulge in the sewn-up portion 22 (FIG. 3(B)). Thereafter, the porous film 3 is bonded to the surface of the fibrous layer 11*a*, and the tubular double-layer structure composed of the fibrous layer 11*a* and the porous film 3 is removed from the dummy cylindrical mold 15 so as to obtain the member for the oil application device of the present invention. This is the same procedure as that of the first method of manufacturing the member for the oil application device.

Figure 4:
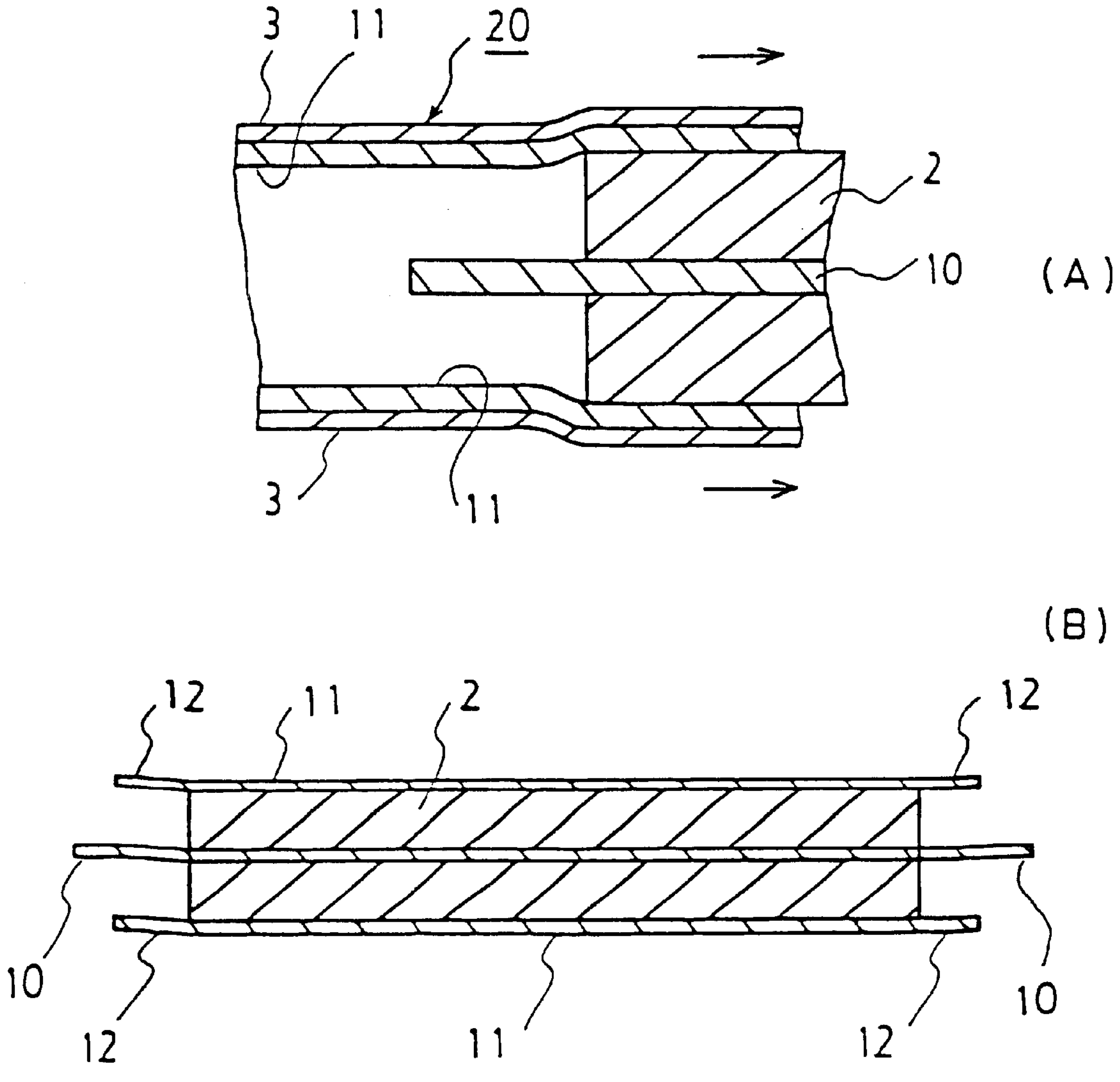
FIGS. 4(A) and 4(B) show a state where a porous cylindrical oil retaining member is covered with the member for the oil application device.
Figure 5:
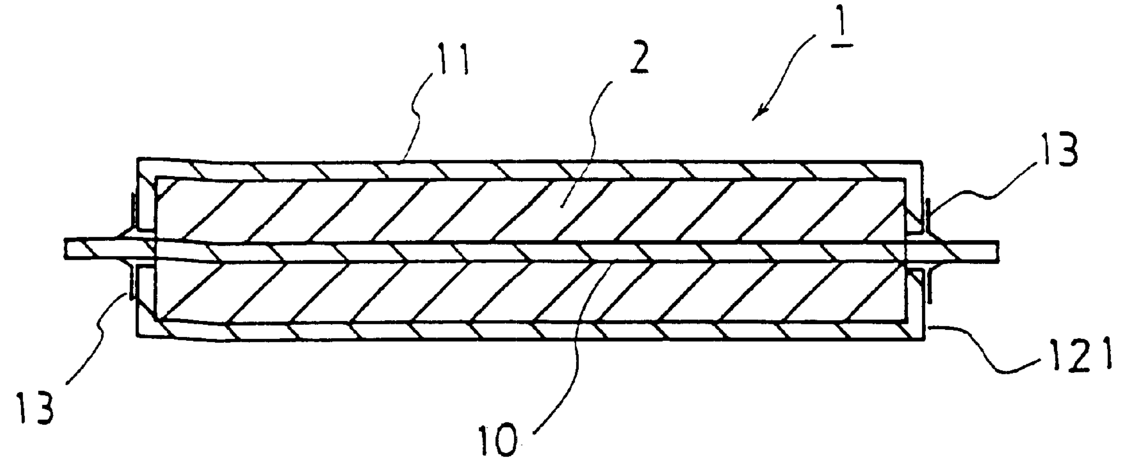
FIG. 5 is an axial sectional view of the oil application device of the present invention.
Figure 6:
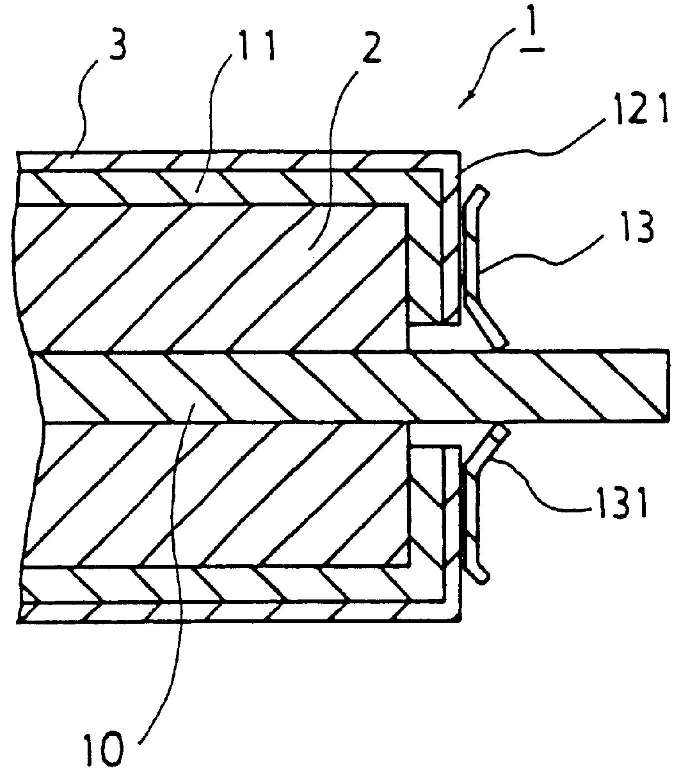
FIG. 6 is an enlarged view of an end portion of FIG. 5.

Next, a method of manufacturing the oil application device of the present invention will be described with reference to FIGS. 4 to 6. FIGS. 4(B) and 5 omit illustration of the porous film 3 constituting the outermost layer. Before a porous cylindrical oil retaining member 2 is covered with the member 20 for the oil application device, the inner diameter of the member 20 for the oil application device is slightly smaller than the outer diameter of the porous cylindrical oil retaining member 2. Accordingly, in order to fit the porous cylindrical oil retaining member 2 with the member 20 for the oil application device such that the peripheral face of the former is covered with the latter, one end portion of the porous cylindrical oil retaining member 2 is inserted into an inner hole 201 of the member 20 for the oil application device and is pressed further inwards (FIG. 4(A)). Thereby, the fibrous layer 11 can be fixed, because of its elasticity, to the porous cylindrical oil retaining member 2 while being in close contact therewith (FIG. 4(B)).

Further, when the porous cylindrical oil retaining member 2 is covered with the member 20 for the oil application device, it is also appropriate that a felt formed into a ribbon-like shape be spirally wound around the porous cylindrical oil retaining member 2 and fixed thereto in advance and that the felt be covered with the member 20 for the oil application device. The felt formed into the ribbon-like shape can be of the same type as the felt formed into the cylindrical shape. A thick, high-density felt with a weight of 500 to 800 g/m$^2$, a thickness of 2 to 3 mm, and a width of 20 to 30 mm is preferable because of its enhanced ability to retain oil. The ribbon-like felt is fixed to the porous cylindrical oil retaining member 2 by applying an adhesive such as silicon rubber or the like to edges of the ribbon-like felt and spirally winding the ribbon-like felt around the porous cylindrical oil retaining member 2 while fitting the adjacent edges to each other. Thereafter, the ribbon-like felt is covered with the member 20 for the oil application device. Such a structure has the thick felt layer formed as the inner layer and thus offers stable application performance. Further, this structure is preferable in that the confronting portions of the felt that has been spirally wound exert little influence on application of oil.

The porous cylindrical oil retaining member 2 is not specifically limited as long as it can retain silicon for application. For example, the porous cylindrical oil retaining member 2 is designed to retain a large amount of silicon oil for application in a group of high-volume pores with a pore diameter of 50 to 2000 $\mu$m and a porosity of 60 to 80%, and is further fitted with a shaft 10. Such an oil retaining member 2 is designed such that releasing oil is retained in the large pores and that inter-fiber gaps serve to transfer releasing oil by means of capillarity, thus making it possible to achieve great ability to retain oil and aging-free oil application performance. The porous cylindrical oil retaining member 2 is preferably made from a porous ceramic compact but is not limited to the aforementioned structure. That is, it is also possible to use a variety of other porous materials including a sponge-like material and a material having a group of pores each having a diameter smaller than 50 $\mu$m.

The porous cylindrical oil retaining member can be manufactured as follows. That is, one or more ceramic fibers selected from silica fiber, silica alumina fiber, alumina fiber and glass fiber, one or more kinds of ceramic particles that are selected from silica particles, silica alumina particles, alumina particles and glass particles and that are blended with one another if need be, one or more inorganic binders selected from silica sol, alumina sol and glass frit, organic resin particles such as polypropylene and so on, an organic binder, and water are used as raw materials. These raw materials are kneaded and formed into a compact of a predetermined shape by extrusion or the like. Furthermore, the compact is dried and calcined, so that the porous cylindrical oil retaining member is obtained. The ceramic fibers to be selected have a fiber diameter of 2 to 30 $\mu$m and a fiber length of 100 to 5000 m. The ceramic particles to be selected have a particle diameter of 10 to 50 $\mu$m. The organic resin particles to be used have a particle diameter of 200 to 2000 $\mu$m.

The above porous ceramic material is provided with a porous structure through gasification of the organic binder, water and organic resin particles at the time of calcination. More specifically, inter-fiber gaps with a main pore diameter of 10 to 100 $\mu$m are formed through gasification of the organic binder and water, and large pores with a diameter of 200 to 2000 $\mu$m are obtained through gasification of organic resin particles. In this porous ceramic material, the large pores serve to store up silicon oil and the inter-fiber gaps serve to transfer silicon oil by means of capillarity.

After the porous cylindrical oil retaining member 2 has been covered with the member 20 for the oil application device, folding edges 12 are formed on opposed sides of the porous cylindrical oil retaining member 2 (FIG. 4(B)). The porous cylindrical oil retaining member 2 is impregnated with releasing oil (application oil) while this state is maintained. The silicon oil for application to be used herein usually demonstrates a low viscosity, that is, $10\times10^{-6}$ to $500\times10^{-6}$ m$^2$/seconds (10 to 500 cSt) at a temperature of 25° C.

Next, the folding edges 12 protruding at opposed end portions of the porous cylindrical oil retaining member 2 are folded inwards so as to cover lateral faces of the porous cylindrical oil retaining member 2. In this case, the porous film 3, which is not shown in the drawings, is also folded in the same manner. Folded portions 121 are then pressed and fixed by a fixture member. A washer 13 that has a hole for passage of a shaft formed at a central portion thereof and that has a fitting claw 131 around the hole can be used as the fixture member. That is, the washer 13 is fitted onto the shaft 10 from an end portion thereof, pressed further inwards against an elastic force of the fitting claw 131, and fixed in such a manner as to press the folded portions 121 from outside.

Figure 7:
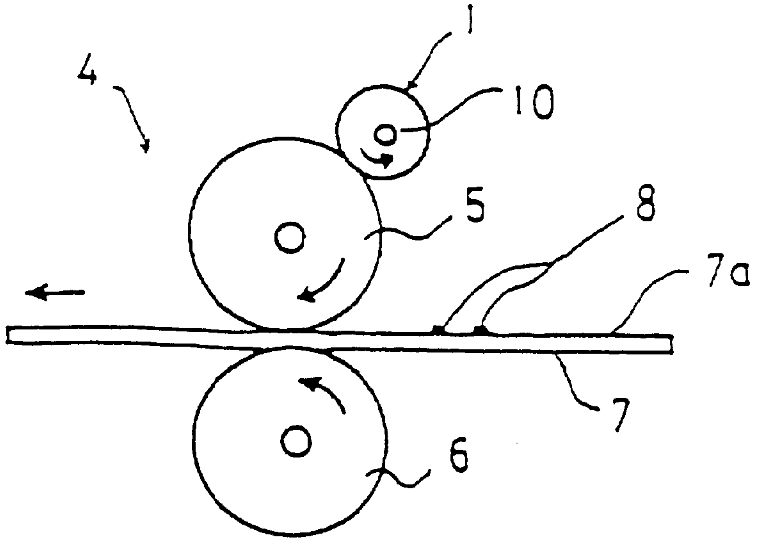
FIG. 7 is a side view showing a state where a fixing device employs the oil application device according to an embodiment of the present invention.

Thus, the oil application device 1 is completed. FIG. 7 is a side view showing a state where the oil application device of the present invention is employed in a fixing device. In FIG. 7, the oil application device, which is denoted by the reference numeral 1, is built into a fixing device 4. The fixing device 4 allows a recording paper 7 to pass through a space between a thermal fixing roll 5 and a press roll 6 so as to fix toner 8 that has been transferred to a surface 7_a_ of the recording paper 7. In order to prevent the toner 8 on the surface 7_a_ of the recording paper 7 from adhering to the thermal fixing roll 5, the oil application device 1 is opposed to and in contact with the thermal fixing roll 5 so as to apply silicon oil, that is, releasing oil for application to the thermal fixing roll 5. Thus, the oil application device is employed in a fixing device of an electronic copying machine or an electronic printing machine.

INDUSTRIAL APPLICABILITY

The present invention is designed such that the porous cylindrical oil retaining member can be covered with the member for the oil application device easily, thus making it possible to fabricate the oil application device easily and enhance the overall productivity. Further, in the case where the porous cylindrical oil retaining member is recycled, the member for the oil application device can be easily removed from the porous cylindrical oil retaining member, and can be fixed thereto without using an adhesive during assembly. Hence, the porous cylindrical oil retaining member is prevented from being soiled with an adhesive. Thus, the recycling cost can be reduced.

Further, the present invention is designed such that the fiber felt can sufficiently perform the function of an oil transfer layer and that the PTFE film can sufficiently perform the function of an oil application amount control layer, thus making it possible to guarantee a fixing roll of uniform application of a predetermined amount of oil.

Further, the present invention is designed such that the adhesive components in their solidified state are dispersed into silicon oil and exist partially inside the open pores, thus making it possible to enhance strength and durability of the porous film. On the other hand, the mixture of an adhesive and silicon oil is microscopically in a state where the adhesive is dispersed into silicon oil. Thus, the silicon oil area serves as a passage for releasing oil inside the open pores. Accordingly, the open pores in the porous film are filled with the mixture, whereby releasing oil is guaranteed of a passage despite closure of the open pores. Consequently, it becomes possible to apply a suitable amount of releasing oil and control the amount of application of releasing oil.

Further, the present invention makes it possible to reliably fabricate the member for the oil application device by a simple method. Further, the sheet-like fibrous layer is formed into a cylindrical shape, whereby the number of seams can be reduced. Thus, it becomes possible to apply oil uniformly without causing irregularities.

Further, the present invention makes it possible to easily fabricate the cylindrical member for the oil application device. Also, the invention makes it possible to suppress the influence of the sewn-up portion and to apply oil uniformly without causing irregularities despite the simplicity of processes of fabrication.

Further, the present invention provides a simple structure in which the porous cylindrical oil retaining member is covered with the tubular member for the oil application device which has been formed separately, thus making it possible to reduce the number of failures and achieve stable application of oil. Further, in the case where the porous cylindrical oil retaining member is recycled, the tubular member for the oil application device can be easily removed from the porous cylindrical oil retaining member. This makes it possible to enhance the workability during recycling.

Further, the present invention makes it possible to fix the tubular member for the oil application device to the porous cylindrical oil retaining member without using an adhesive.

What is claimed is:

1. A method of manufacturing a member for an oil application device, comprising:

folding a sheet-like fibrous material in two and sewing up end portions thereof to form a sleeve;

inventing the sheet-like fibrous material sleeve that has been sewn up and covering a dummy cylindrical mold, which is substantially equal in diameter to a porous cylindrical oil retaining member to be covered, with the invented sheet-like fibrous material sleeve;

winding a sheet-like porous film around a surface of the invented sheet-like fibrous material sleeve covering the dummy cylindrical mold by one turn so as to bond the sheet-like porous film to the invented sheet-like fibrous material sleeve to form the member; and removing the member from the dummy cylindrical mold.

2. The method according to claim 1, wherein said fibrous material is a fiber felt.

3. The method according to claim 1, wherein said porous film is a PTFE film.

4. The method according to claim 1, wherein said fibrous material is a fiber felt having a three-dimensional flexible network structure with a weight of 200 to 800 g/m$^2$, a thickness of 1 to 5 mm and a density of 170 to 260 kg/m$^3$.

5. The method according to claim 1, wherein said porous film is a PTFE film with a surface roughness Ra of 0.7 to 0.8 $\mu$m, a thickness of 20 to 100 $\mu$m, a gas permeability of 5 to 100 seconds/100 cc, an open pore diameter of 0.05 to 2.0 $\mu$m, and an open porosity of 70 to 90%.

6. The method according to claim 1, wherein said fibrous material and said porous film are bonded together by a mixture of an adhesive and silicon oil.

* * * * *